United States Patent
Esfahani et al.

(10) Patent No.: US 6,434,695 B1
(45) Date of Patent: Aug. 13, 2002

(54) COMPUTER OPERATING SYSTEM USING COMPRESSED ROM IMAGE IN RAM

(75) Inventors: Cameron J. Esfahani, Sunnyvale; Paul M. Resch, Santa Clara; Ronald Hochsprung, Los Gatos; William M. Galcher, Mt. View, all of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/220,160

(22) Filed: Dec. 23, 1998

(51) Int. Cl.[7] ............................ G06F 13/00; G06F 30/00
(52) U.S. Cl. ............................... 713/2; 710/1; 710/20; 711/165; 711/203; 711/206; 713/1
(58) Field of Search ................... 710/1, 20; 711/165, 711/203, 206; 713/1, 2

(56) References Cited

U.S. PATENT DOCUMENTS

| | | | |
|---|---|---|---|
| 5,109,521 A | | 4/1992 | Culley ...................... 711/165 |
| 5,579,522 A | | 11/1996 | Christeson et al. ............ 713/2 |
| 5,600,766 A | * | 2/1997 | Deckys et al. .............. 395/135 |
| 5,671,413 A | | 9/1997 | Shipman et al. ............... 713/2 |
| 5,696,926 A | * | 12/1997 | Culbert et al. ............... 711/203 |
| 5,836,013 A | * | 11/1998 | Greene et al. ................. 713/2 |
| 5,901,310 A | * | 5/1999 | Rahman et al. ................ 713/1 |
| 5,940,871 A | * | 8/1999 | Goyal et al. ................. 711/206 |
| 6,195,107 B1 | * | 2/2001 | Iverson ....................... 345/516 |
| 6,216,225 B1 | * | 4/2001 | Yoo ............................ 713/2 |

OTHER PUBLICATIONS

Developer Note, Apple Computer, Inc., *Apple iMac Computer*, 1998, pp. 1–75.

B. Croft, et al., "Network Working Group Request for Comments (RFC) 951", Sep. 1985, 9 pgs.

IEEE Computer Society, "IEEE Standard for Boot (Initialization Configuration) Firmware: Core Requirements and Practices", Oct. 28, 1994, 264 pgs.

* cited by examiner

*Primary Examiner*—Jeffrey Gaffin
*Assistant Examiner*—Tammara Peyton
(74) *Attorney, Agent, or Firm*—Blakely, Sokoloff, Taylor & Zafman LLP

(57) ABSTRACT

A low-level portion of the operating system of a computer system is separated from an intermediate-level portion of the operating system. The low-level portion, including hardware-specific code, is stored in a relatively small read-only memory (ROM), while at least part of the intermediate-level portion is stored as a compressed ROM image on a disk or other mass storage device, which may be located remotely from the computer system. Upon power-up or reset of the computer system, the code in the ROM is executed to read the compressed ROM image into random access memory (RAM) of the computer system. The compressed image is then decompressed and executed as part of the boot sequence. Once decompressed, the portion of RAM storing the intermediate-level code is write-protected in the memory map, and the code in boot ROM is deleted from the memory map. Memory space in RAM that is allocated to the intermediate-level code but not used is returned to the operating system for use as part of system RAM.

41 Claims, 11 Drawing Sheets

COMPUTER OPERATING SYSTEM USING COMPRESSED ROM IMAGE IN RAM

FIELD OF THE INVENTION

The present invention pertains to the field of computer operating systems. More particularly, the present invention relates to facilitating the debugging and upgrading of a computer operating system.

BACKGROUND OF THE INVENTION

The Macintosh line of computer systems from Apple Computer, Inc. of Cupertino, Calif., is a well-known line of computer systems. The Macintosh computer's permanent read-only memory (ROM), historically called the Macintosh ToolBox ROM, has traditionally been structured as one monolithic ROM, which contained both low-level and high-level operating system (OS) code. That is, the ToolBox ROM contained the routines needed by the computer at power-up time (e.g., hardware knowledge, initialization, diagnostics, drivers, etc.), as well as a significant amount of higher-level OS code. Examples of hardware-specific software are drivers, feature tables, diagnostics, and hardware initialization code. Examples of the higher-level software are high level managers, experts and other higher level software, such as QuickDraw, Small Computer Systems Interface (SCSI) Manager, etc. This combining of high-level and low-level OS code resulted from the fact that, when the first Macintosh computers were designed, ROM was cheaper than random access memory (RAM), and the available disk space (which was floppy-based) was at a premium. Because the higher-level code was not expected to change substantially, it was logical from an economic and performance standpoint to include as much higher-level code as possible in the ROM along with the start-up code.

As a result of the expanding set of Macintosh OS features, however, some of the higher-level code (and hardware-specific code not explicitly needed before booting) has expanded beyond the practical limits provided by ROMs. The size of the ToolBox ROM code in recent Macintosh machines has been approximately 4 Megabytes. The architecture of the Macintosh OS has evolved to the point where the ROM could be augmented and modified by System Software, such as the System file or the Enabler (a smaller file which can override the System file). In this way, the functionality of the ROM could be spread out among the ROM, Enabler and the disk-based System Software. However, this intertwining of hardware and software code spread out from ROM to disk makes the production of new, improved computer systems more difficult and time consuming.

Using the traditional approach, designing a major new computer system or making even a minor revision to computer hardware typically entails having to modify the ROM, the Enabler, and/or the System Software. That is, if even just a small, hardware-specific part of the ROM has to be changed to accommodate a hardware change, the entire ROM would have to be rebuilt. Once the ROM rebuilding occurs, substantial time and expense is required to rigorously test it and the companion system software. Patches to the firmware and software tend to be complicated, adding to the need for testing. The new System build needs to be tested on many different platforms running different versions of the OS, to make sure it correctly ran on the large number of different hardware and software combinations. Each new release over the years has built upon the old ones and added more complexity to the coding and demands on testing engineers. Thus, it is desirable to have a way to increase reliability and to reduce time to market, development costs, and manufacturing costs for computer systems.

SUMMARY OF THE INVENTION

A method and apparatus for use in booting a computer system are provided. The method includes loading a compressed image of a first portion of the OS of the computer system into a storage device of the computer system, which may be RAM, for example. The compressed image of the first portion of the OS is then decompressed and executed as part of the boot sequence of the computer system.

In particular embodiments, the first portion of the operating system may include an intermediate-level portion of the operating system, while a second, low-level portion of the operating system containing hardware specific aspects are stored in read-only memory. The process of transferring the first portion from non-volatile storage to volatile storage and decompressing the first portion may be initiated by the low-level portion stored in the read-only memory. Once decompressed, the portion of memory storing the first portion of the operating system may be write-protected, and this read-only memory portion may be mapped out of the address space of RAM used by the operating system.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A computer OS using a compressed ROM image in RAM is described. In brief, the low-level portion of an OS of a computer is designed to be separate from the intermediate-level portion of the OS. The low-level portion, which includes hardware-specific code, is stored in a relatively small Boot ROM, while at least part of the intermediate-level portion is stored as a compressed ROM image on a disk or other mass storage device. The mass storage device may be located remotely from the computer system, such as in a file server. Upon power-up or reset of the computer system, the code in the boot ROM is executed to read the compressed ROM image into RAM, i.e., system memory, of the computer system. The compressed image is then decompressed and executed as part of the boot sequence.

Figure 1:
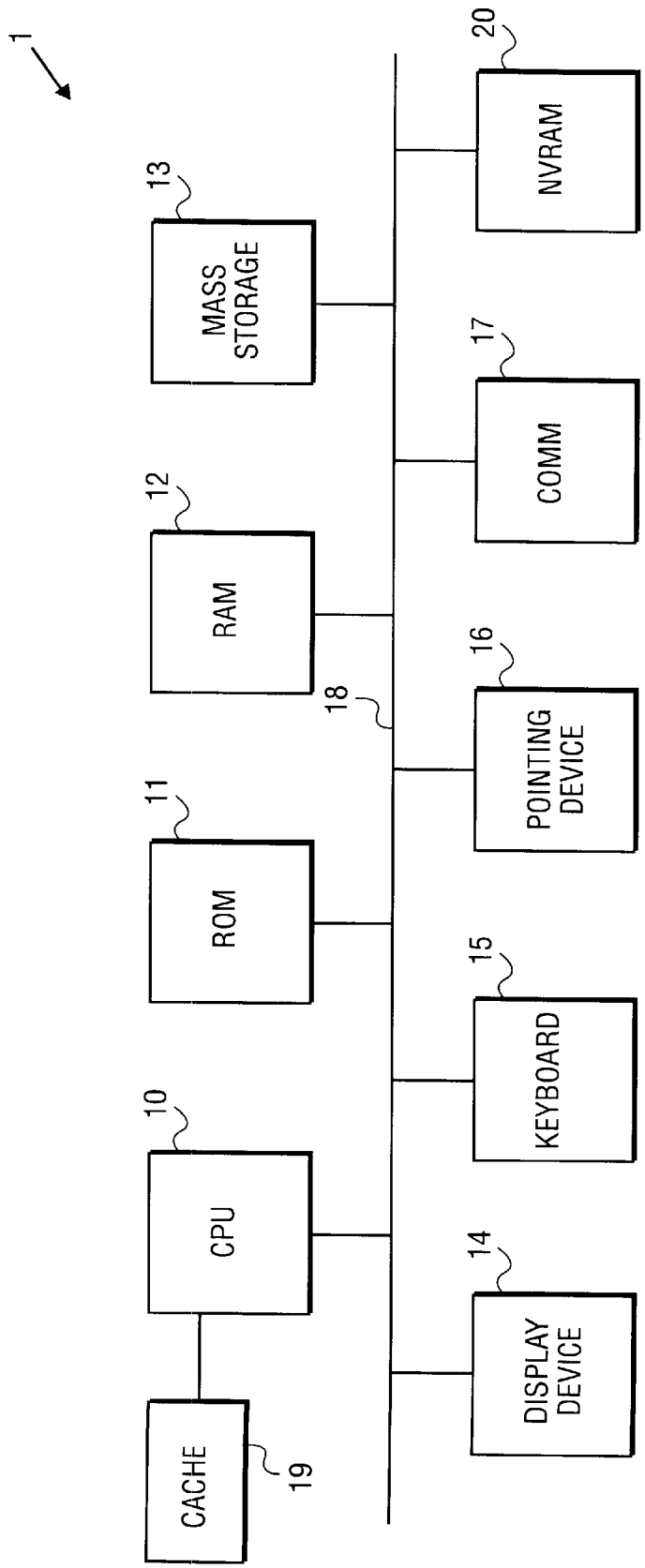
FIG. 1 is a block diagram of a computer system.

FIG. 1 illustrates a computer system 1 in which the present invention may be implemented. Note that while FIG. 1 illustrates the major components of a computer system, it is not intended to represent any particular architecture or manner of interconnecting the component; such details are not germane to the present invention. The computer system of FIG. 1 may be, for example, an Apple Macintosh computer, such as an Apple iMac computer. As shown, the computer system 1 of FIG. 1 includes a microprocessor 10, a read-only memory (ROM) 11, random access memory (RAM) 12, each connected to a bus system 18. The bus system 18 may include one or more buses connected to each other through various bridges, controllers and/or adapters, such as are well-known in the art. For example, the bus system may include a "system bus" that is connected through an adapter to one or more expansion buses, such as a Peripheral Component Interconnect (PCI) bus, or the like. Also coupled to the bus system 18 are a mass storage device 13, a display device 14, a keyboard 15, a pointing device 16, a communication device 17, and non-volatile RAM (NVRAM) 20. A cache memory 19 is coupled to the microprocessor 10.

Microprocessor 10 may be any device capable of executing software instructions and controlling operation of the computer system, such as a "G3" PowerPC processor, for example, or an x86 class microprocessor. ROM 11 may be a non-programmable ROM, or it may be a programmable ROM (PROM), such as electrically erasable PROM (EEPROM), Flash memory, etc. Mass storage device 13 may include any device for storing suitable large volumes of data, such as a magnetic disk or tape, magneto-optical (MO) storage device, or any variety of Digital Versatile Disk (DVD) or compact disk ROM (CD-ROM) storage. Display device 14 may be any device suitable for displaying alphanumeric, graphical and/or video data to a user, such as a cathode ray tube (CRT), a liquid crystal display (LCD), or the like, and associated controllers. Pointing device 16 may be any device suitable for enabling a user to position a cursor or pointer on display device 17, such as a mouse, trackball, touchpad, stylus with light pen, voice recognition hardware and/or software, etc. Communication device 17 may be any device suitable for or enabling the computer system 1 to communicate data with a remote processing system over a communication link, such as a conventional telephone modem, a cable television modem, an Integrated Services Digital Network (ISDN) adapter, a Digital Subscriber Line (xDSL) adapter, a network interface card (NIC), an Ethernet adapter, etc.

It will be apparent from this description that aspects of the present invention may be embodied, at least in part, in software. That is, the technique may be carried out in a computer system in response to its microprocessor executing sequences of instructions contained in a memory, such as ROM 11, RAM 12, mass storage device 13, cache 19, or a remote storage device. In various embodiments, hardwired circuitry may be used in place of, or in combination with, software instructions to implement the present invention. Thus, the technique is not limited to any specific combination of hardware circuitry and software, nor to any particular source for the instructions executed by a computer system.

In addition, throughout this description, various functions and operations are described as being performed by or caused by software code (or other similar phrasing) to simplify description. However, those skilled in the art will recognize that what is meant by such expressions is that the functions result from execution of the code by a processor, such as microprocessor 10.

Figure 2:
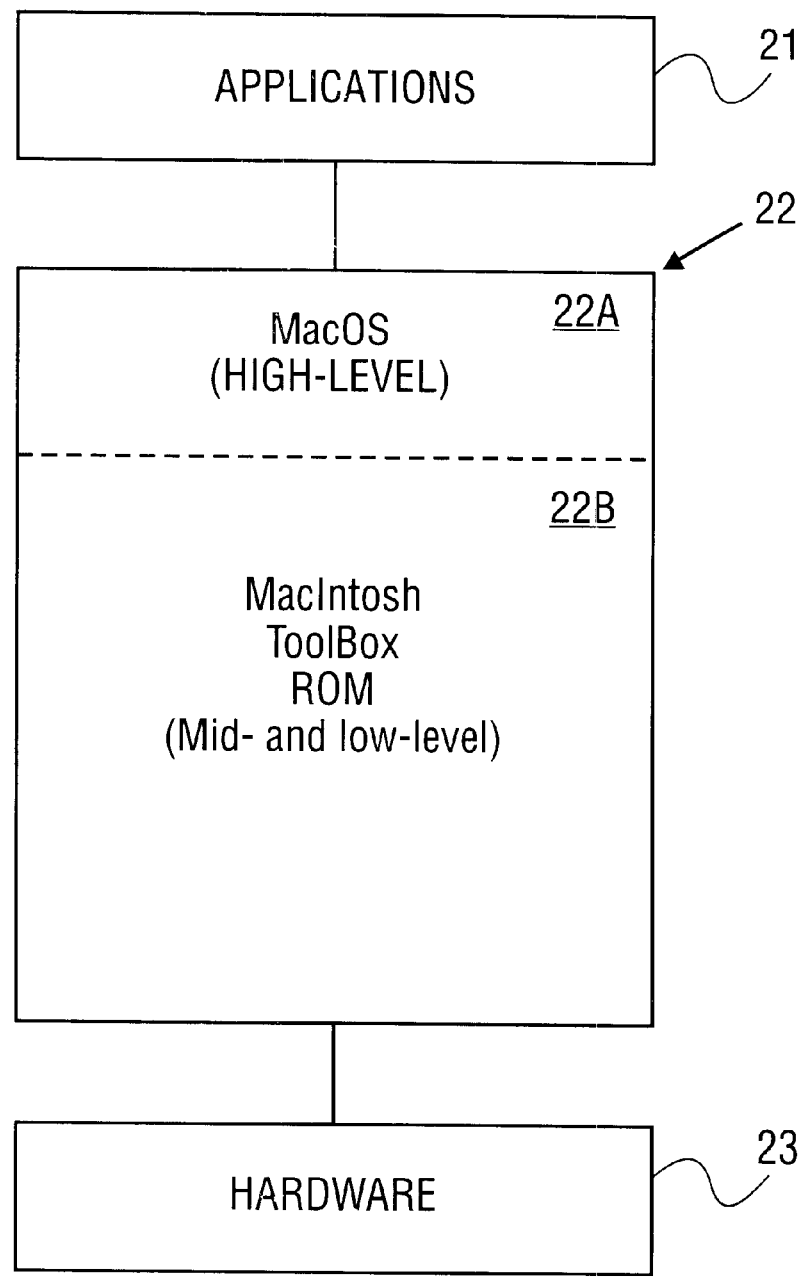
FIG. 2 illustrates the structure of a Macintosh operating system (OS).

Refer now to FIG. 2, which illustrates the structure of a traditional Macintosh OS. The OS 22 provides an interface between the hardware 23 of the computer system and the software applications 21. The OS includes the so-called MacOS 22A, which is the high-level portion of the OS 22. In this context, "high-level" refers to the portion of the OS 22 which is least hardware-specific and has the greatest degree of abstraction. Traditionally, this file would reside on disk or other mass storage device and would typically be the last portion of the OS22 to be invoked during the boot process. The (traditional Macintosh) OS22 also includes the so-called ToolBox ROM code 22B. The ToolBox ROM code 22B is firmware that resides in a ROM. The ToolBox ROM code 22B represents the middle- or intermediate-level and low-level portions of the OS22. In this context, "low-level" refers to the portion of the OS which is most hardware-specific and has the smallest degree of abstraction. The middle-level portion has degrees of hardware-dependence and abstraction lower than those of the high-level OS22A and greater than those of the low-level OS.

As noted above, the ToolBox ROM code 22B has grown in size substantially over the years, with the introduction of new OS features and hardware. In recent Macintosh models, the size of the ToolBox ROM code has been approximately four Megabytes. Further, the intertwining of hardware-specific code with higher-level code has complicated debugging and upgrading processes. Thus, it is desirable to provide an improved OS which overcomes these and other problems.

Toward that end, various details provided in this description are specific to Macintosh computer systems. Note, however, that the concepts of the present invention are not limited to application to a Macintosh platform. For example, these concepts may also be applied to x86 processor based computer systems, as well as other types of computing platforms.

Overview of the Improved OS

Figure 3:
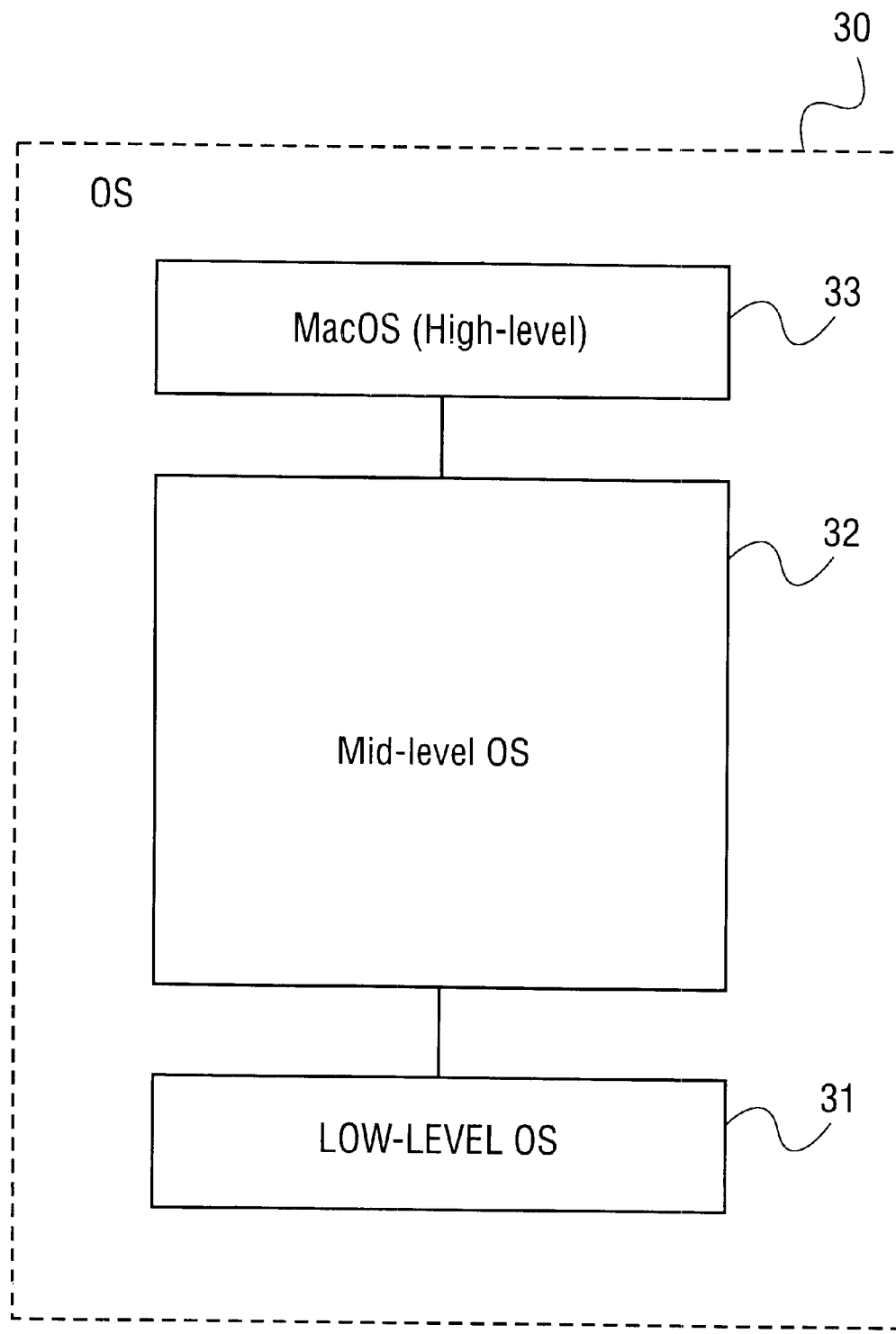
FIG. 3 illustrates the structure of an improved OS that has separate high-level, intermediate-level, and low-level portions.

The present invention addresses the above-noted problems by providing an improved OS in which the hardware-specific and higher level system software code are separated into logically distinct pieces, as illustrated in FIG. 3. The low-level portion 31 of the improved OS 30 contains the hardware-specific components needed to boot, while a separate, mid-level portion 32, contains boot-time ToolBox routines and components that are common to many Macintosh computers. With this approach, the hardware-specific code is isolated and the ToolBox and system software code can be made abstract and generic. The highest-level portion, the MacOS 33, is also separate from the mid-level portion 32 and the low-level portion 31 and, as with prior Macintosh computers, may reside on a disk or other mass storage medium.

The benefits of this approach include the following: When hardware changes are needed, only the hardware-specific code has to be modified, greatly decreasing the turnaround time for new products and software product releases, and reducing testing time and expenses. The higher-level ToolBox and System Software seldom needs to change. This approach further provides high confidence that the higher level software has not been changed when creating a new build as a result of changing the hardware-dependent code. Changing the higher-level software less frequently simplifies testing and reduces the time to develop system software and fix bugs. In addition, the memory footprint may be reduced, since fewer patches may be required as the higher-level software is consolidated and unchanged. Running an OS other than the MacOS, such as Rhapsody, becomes simpler. Also, costs tend to be reduced. Today, RAM and disk space are inexpensive, have high capacity, and are fast compared to the ROM, RAM and disk in the original Macintosh.

Figure 4:
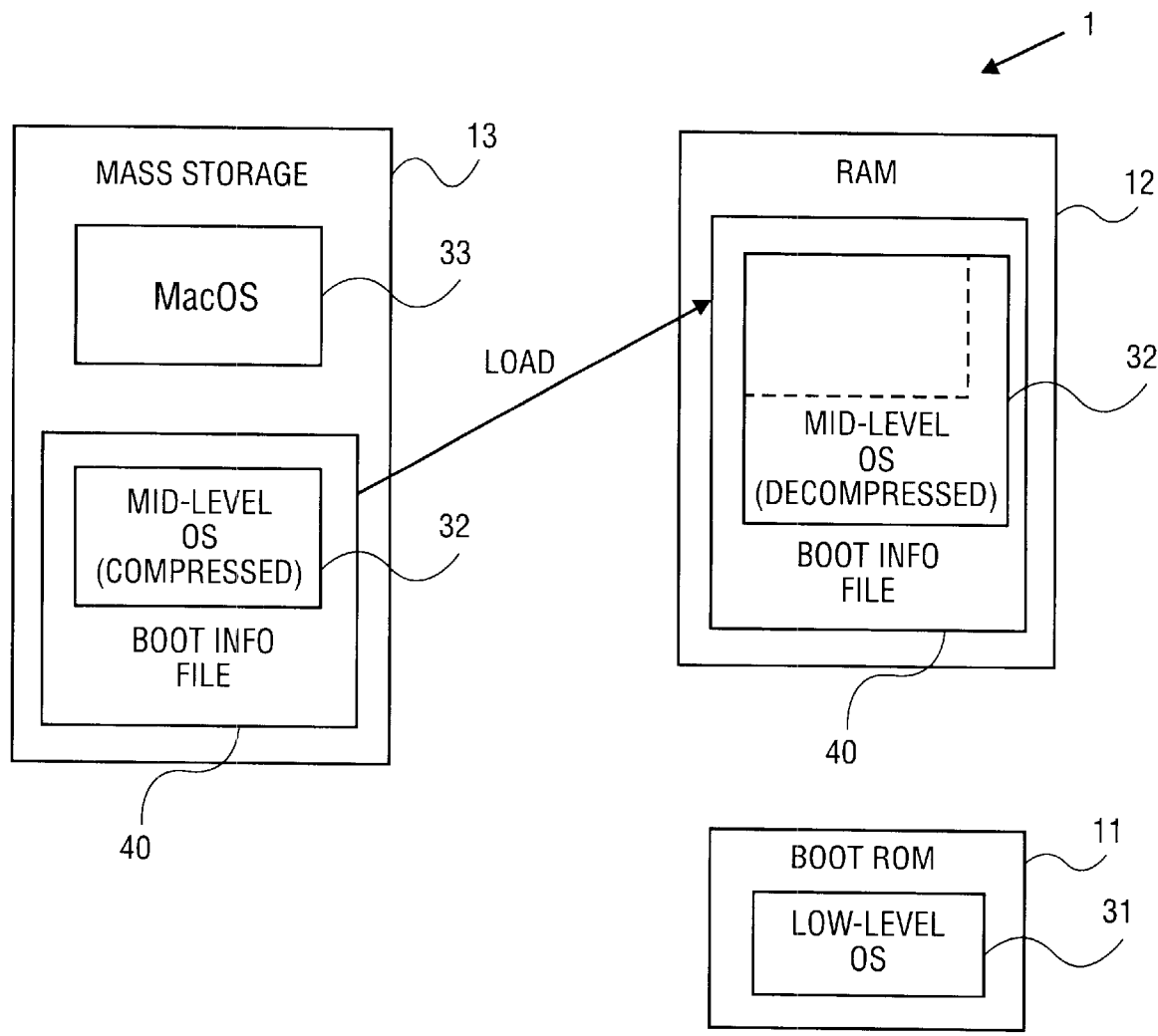
FIG. 4 illustrates an aspect of a boot sequence of the improved OS, in which a compressed ROM image is read into RAM.

Referring now to FIG. 4, in the improved OS, the low-level (hardware-specific) OS code 31 resides in firmware, in order to handle start-up activities of the computer system. This code fits into one, relatively small ROM, referred to as the Boot ROM 11. Thus, Boot ROM 11 includes all of the hardware-specific code and tables needed to start up the computer as well as to boot the OS and provide common hardware access services the OS might require. Note that the Boot ROM code is not specific to the MacOS or to any other OS. All higher-level software resides elsewhere, as will now be described.

Prior to start-up, the mid-level portion 32 of OS 30 (which corresponds to part of the ToolBox ROM of earlier Macintosh computers) resides in compressed form in a file 40, referred to as Boot Info file 40. Except for certain modifications described below, the Boot Info file 40 generally conforms to the "Open Firmware" standard, i.e., Institute of Electrical and Electronics Engineers (IEEE) Standard 1275–1994, "Standard for Boot (Initialization, Configuration) Firmware: Core Requirements and Practices," hereinafter simply "Open Firmware", which is incorporated herein by reference. The improved OS architecture, according to one embodiment, uses a modified version of Open Firmware which contains several changes from the earlier versions found in the first and second generation PCI Macintosh computers: In particular, the Open Firmware is capable of reliably reading files from block devices; builds a new Device Tree that holds essentially every facet of hardware information needed by an OS; and contains code that mimics the StartSearch code (the code which searches for suitable boot device) in the ToolBox ROM and provides a Mac-like user interface during start-up. Subsequent references to "Open Firmware" in this description refer to this modified version, unless stated otherwise.

Boot Info file 40 may be initially stored on a disk or other mass storage device 13, which may be a component of computer system 1 or it may be remotely located, such as in a network server. During start-up, the Boot Info file 40 is loaded into RAM 12, and the compressed mid-level OS 32 is decompressed. Hence, the mid-level OS 32 is essentially a compressed ROM image. The mid-level OS 32 is inserted into the memory map of the computer system as if it were firmware in ROM. That is, the ROM image can be write-protected in the memory map.

Thus, the improved OS 30 loads the ROM Image 32 into RAM 12, and marks it as read-only. In one embodiment, the ROM image is approximately four Megabytes in size—the ROM image includes much of the earlier ToolBox ROM code—however, not all of this memory space is used. Consequently, the portion that is not used is eventually returned to the Mac OS 33 during boot up, for use as part of system RAM 12. Note that a consequence of having the ROM image in RAM is that it is possible to have a memory map alias to the ROM image that allows changes. As a result, the improved OS (with an appropriate version of debugging software, such as Apple MacsBug) supports setting break-points in the "ROM".

One difference between the improved OS 30 and the traditional Macintosh ToolBox ROM code is the inclusion in the ROM image of all code that supports any hardware that is expected (or likely) to be used, and the addition of run-time checks that determine which such code is to be used, given the hardware actually installed. Thus, with the improved OS, a single ROM Image may be used to support many existing and future computer systems having a variety of different hardware configurations. When an upgrade or modification to the hardware is made, the appropriate software can be written and integrated into the existing ROM Image, so that it determines the correct code path at boot-time or run-time. New versions of the ROM Image can provide support for systems that use previous versions.

The high-level portion 33 of the Macintosh OS, i.e., the MacOS System Software (the components in the System Folder) can remain largely unchanged. However, some changes may be desirable to support the improved OS. For example, in one embodiment of the improved OS, the StartSearch functionality is moved to the Open Firmware code. Consequently, in such an embodiment, the Startup Disk control panel may require changes to inform Open Firmware of the user-selected startup volume.

One aspect of the improved OS is the ability to support varying hardware implementations, including the lack of some of the traditional Macintosh Input/Output (I/O) ports. Some components may be changed to make more informed decisions on the selection of default behavior. For example, Open Transport may no longer default to selection of the "Printer Port" (using LocalTalk).

Figure 5:
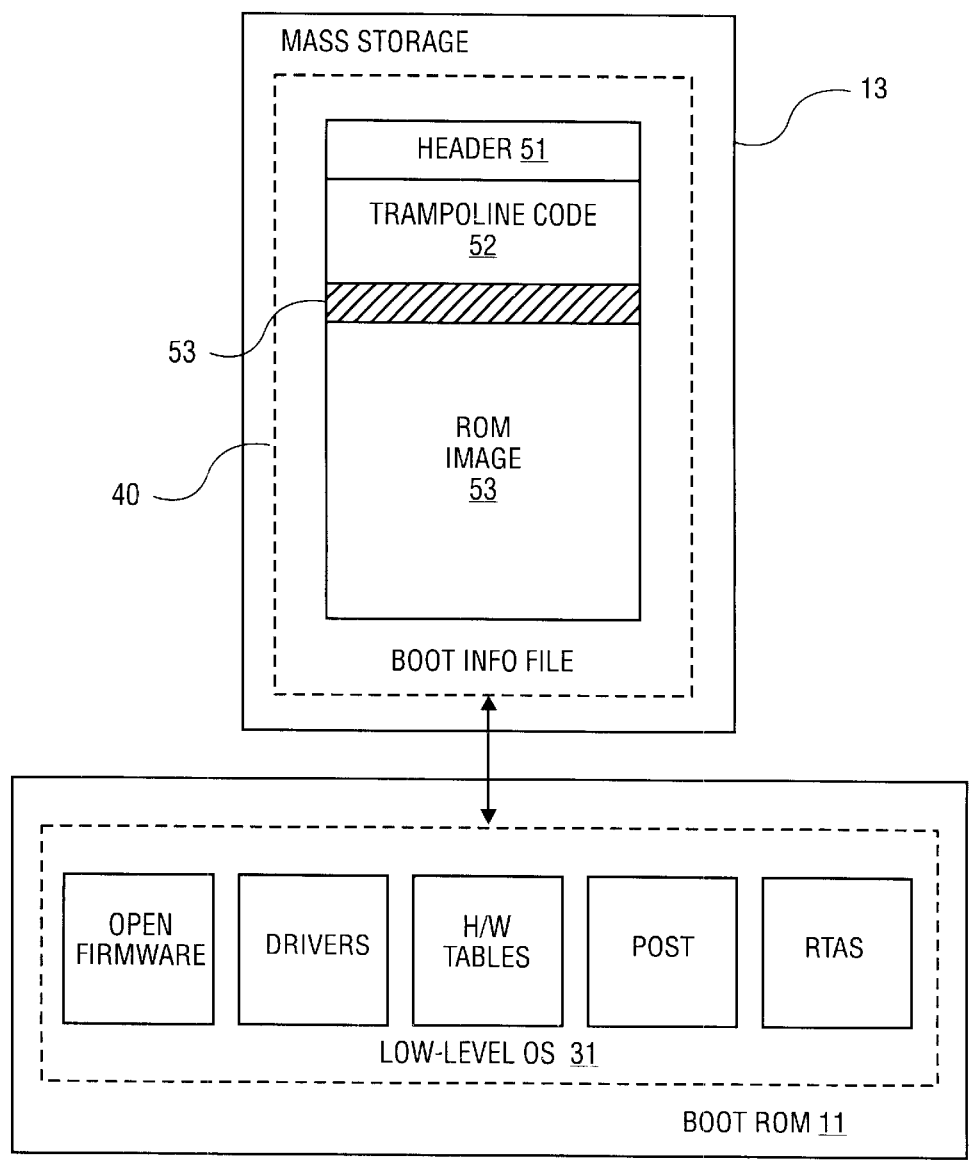
FIG. 5 illustrates components of a Boot Info File and contents of the Boot ROM.

Referring now to FIG. 5, the low-level OS portion 31 and the Boot Info file 40 are illustrated in greater detail. The low-level portion 31 stored in Boot ROM 11 contains the code needed to start up the computer, initialize and examine the hardware, provide a Device Tree (per Open Firmware) to describe the hardware, provide hardware access services, and transfer control to the OS. In one embodiment, the components of the low-level portion 31 include:

code for performing Power-On Self Test (POST), including code for performing diagnostics, generating a boot beep and an error beep;

Open Firmware code;

hardware-specific Mac OS drivers ("ndrv's") that are needed at boot time (drivers needed at boot time, e.g.,video drivers, network drivers, or disk drivers, are loaded from the Device Tree);

HardwareInit code (i.e., the lowest-level code for initializing the CPU, RAM, clock, system bus, etc.) without Mac OS-specific code;

code for performing Run-Time Abstraction Services (RTAS). Certain hardware devices differ from machine to machine, but provide similar functions. RTAS provides such functions, including functions for accessing the real-time clock, NVRAM 20, restart, shutdown, and PCI configuration cycles. The I/O primitives for these functions in the ROM Image make use of RTAS.

The POST code is the code executed when the computer first boots. This encompasses many of the traditional Mac ROM operations and is based on the HardwareInit code used in prior Macintosh OSs. The operations include setup and initialization of the microprocessor 10 and ASICs in the computer system 1.

RTAS can be thought of as a Basic Input/Output System (BIOS). In particular, RTAS is the code that handles hardware accesses needed by an OS. RTAS allows multiple OSs to obtain hardware services without having to know the specifics and handles things such as NVRAM (containing parameter RAM), time services (e.g., the real time clock), and other hardware-unique services (for example, PCd configuration cycles, power management, and the code needed to restart and shutdown). RTAS is instantiated in RAM wherever the OS asks it to be located, and persists after the OS boots. RTAS also allows for the provision of cache-control functions.

The Boot Info file 40 will now be described in greater detail. The Boot Info file 40 may be stored in the System Folder of the start-up volume. Alternatively, the Boot Info file 40 may be provided by a network server using, for example, the Bootstrap Protocol (BootP), which is described in B. Croft et al., Network Working Group Request for Comments (RFC) 951, September 1985. Referring to FIG. 5, the Boot Info file 40 includes Open Firmware-specific Mac OS code 52, referred to as the "Trampoline code"; an Open Firmware header 51, which includes a Forth script that performs operations necessary to the start-up of the OS, including validation tests and transfer of control to the Trampoline code; and a compressed ROM Image 53, which represents the mid-level portion 32 of the OS 30. The purpose of the header 51 is, generally, to specify the locations of the other components of the Boot Info file 40. The purpose of the Trampoline code 53 generally is to handle the transition between the Open Firmware code in the Boot Rom 11 and the ROM Image 52, as will be described in greater detail below.

In one embodiment, the ROM image 53 includes the following components:
  the kernel of the OS;
  the 68K Emulator (code which enables other code designed for an older 68K processor to run on a later processor, such as the G3);
  higher-level software common to all Macintosh computers that is needed at boot time, including, for example: StartInit code (one-time hardware initialization code); and ToolBox routines, including QuickDraw; Apple Desktop Bus (ADB) Manager; Universal Serial Bus (USB) Manager (and mouse/keyboard drivers); SCSI Manager; ATA/IDE Manager; and provisions for network booting; and
  software common to many Macintosh computers that is needed at boot time, such as: software for controlling ADB, power, clock, NVRAM, timers, interrupts, serial ports, USB, and SCSI.

Note that in alternative embodiments of the OS 30, some or all of the above mentioned components of the ROM image 53 may be provided as separate, compressed elements. These separate elements may be embodied in separate Boot Info files or in a single Boot Info file. This approach would allow the OS components that are required for a given machine to be individually selected, decompressed as part of the ROM image, and used as part of the OS 30, while unnecessary components could be ignored. For example, components which might be embodied separately include the kernel, the 68K Emulator, particular drivers or other software components that are not common to all Macintosh computers, and code libraries. Hence, this approach may reduce the amount of RAM consumed by the OS. For example, if components are stored in separate boot Info files, then only the necessary Boot Info files would need to be read into RAM during the boot process. Alternatively, if components are embodied as discrete components within a single Boot Info file, then the system might read the Boot Info file into RAM, identify the needed components, decompress only the needed components into a separate memory space, and return the unused memory space to the OS for use as system RAM.

The Boot Info file 40 resides on the boot device (e.g., a disk, or on a network) and has a localizable name. Identification information that leads to the file's path may be stored in NVRAM 20 or another suitable location, and the search algorithm for a usable Boot Info file parallels the search mechanism across SCSI, ATA, etc., used in the earlier Macintosh OS's StartSearch routine. By default, the Boot Info file 40 is located by using the current, active System folder's dirID (directory ID) in the boot block of each partition of the Hierarchical File System (HFS) and then searching for a file with a predetermined file type. Searching by file type is done to allow localization of the file.

The Open Firmware script and other Boot Info components may be built together with the other main Boot Info file components. The Open Firmware script may be modified at build time to have the correct offsets within the Boot Info file to the other two main components. The OS icons in the Boot Info file (Open Firmware uses OS icons to display BootInfo file choices) may require alteration. Additional user interface components to provide interactive selection of boot options (e.g., "disable loading extensions" or "reset PRAM") may be used for this component.

The Trampoline code 53 is the component that handles the transition between the Open Firmware code in the Boot Rom 11 and the ROM Image 52. Generally, the Trampoline code 52 retrieves necessary information about the system from Open Firmware; instantiates RTAS; decompresses the ROM Image 5; locates the OS NVRAM partition; formats the system information into tables and data structures for OS; terminates Open Firmware; moves information in memory to "safe" locations; and transfers control to the ROM Image 53. Note that changes to the Trampoline code 52 may be necessary to recognize any newly supported hardware.

The ROM Image 53 of the improved OS 30 is similar to the ToolBox ROM code of the earlier Macintosh OS, in that it has a similar layout and contains many of the same components. The image may be compressed using a known compression algorithm, such as LZSS, for example. The ROM Image 53 may also be encoded, if desired.

Overall Boot Process

Figure 6A:
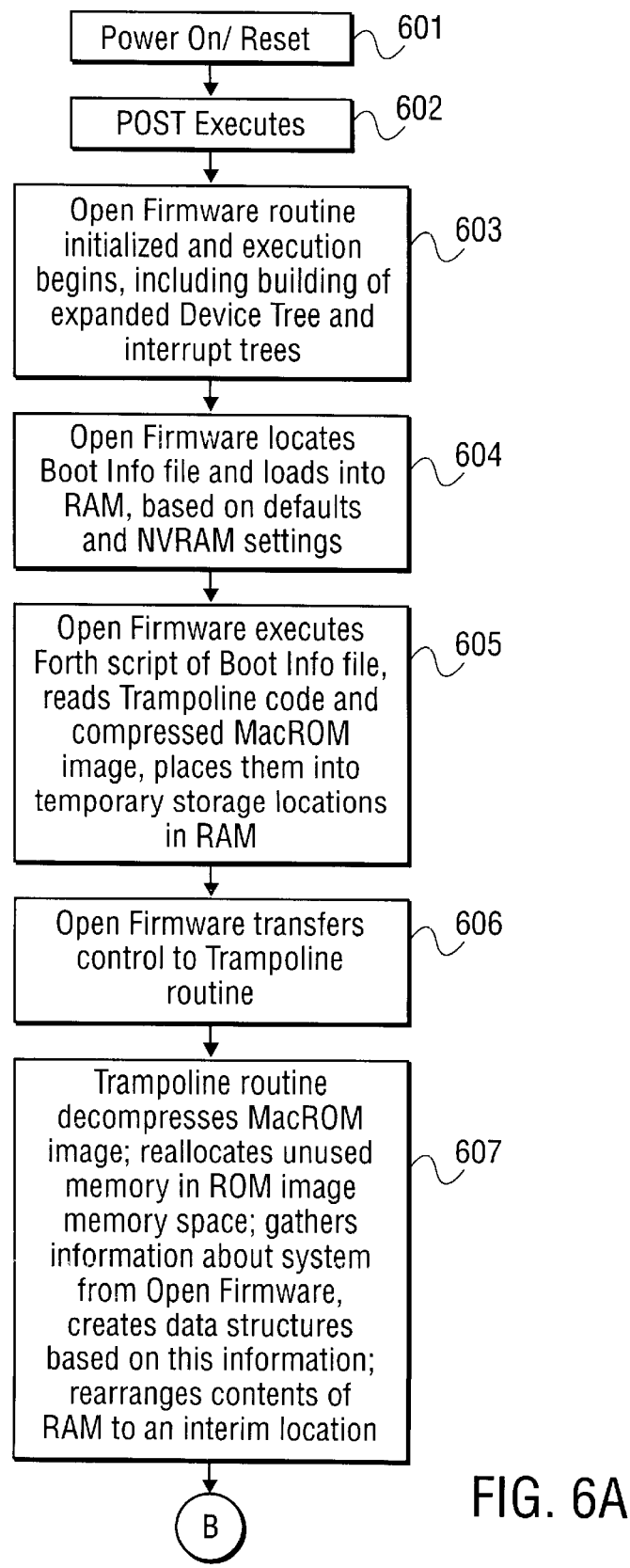
FIGS. 6A and 6B collectively are a flow diagram illustrating a boot sequence associated with the improved OS.
Figure 6B:
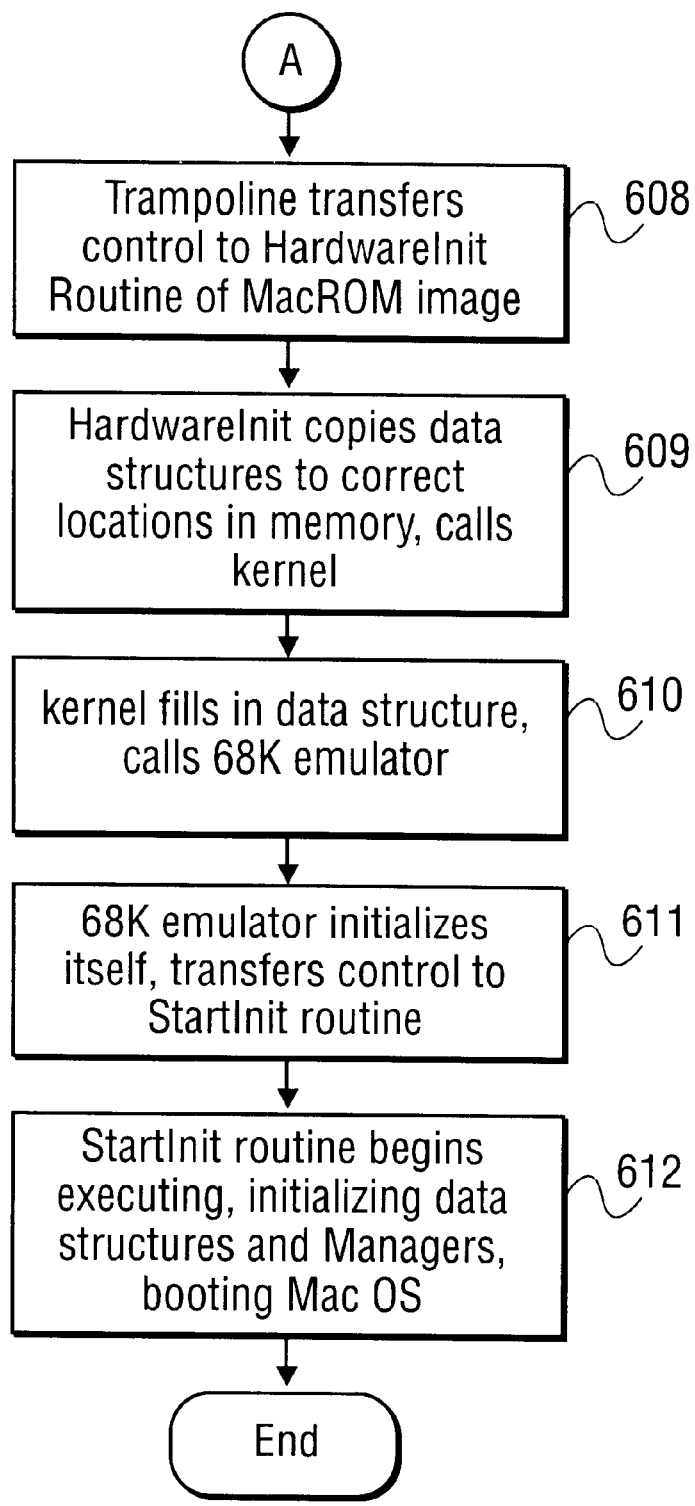
Figure 7A:
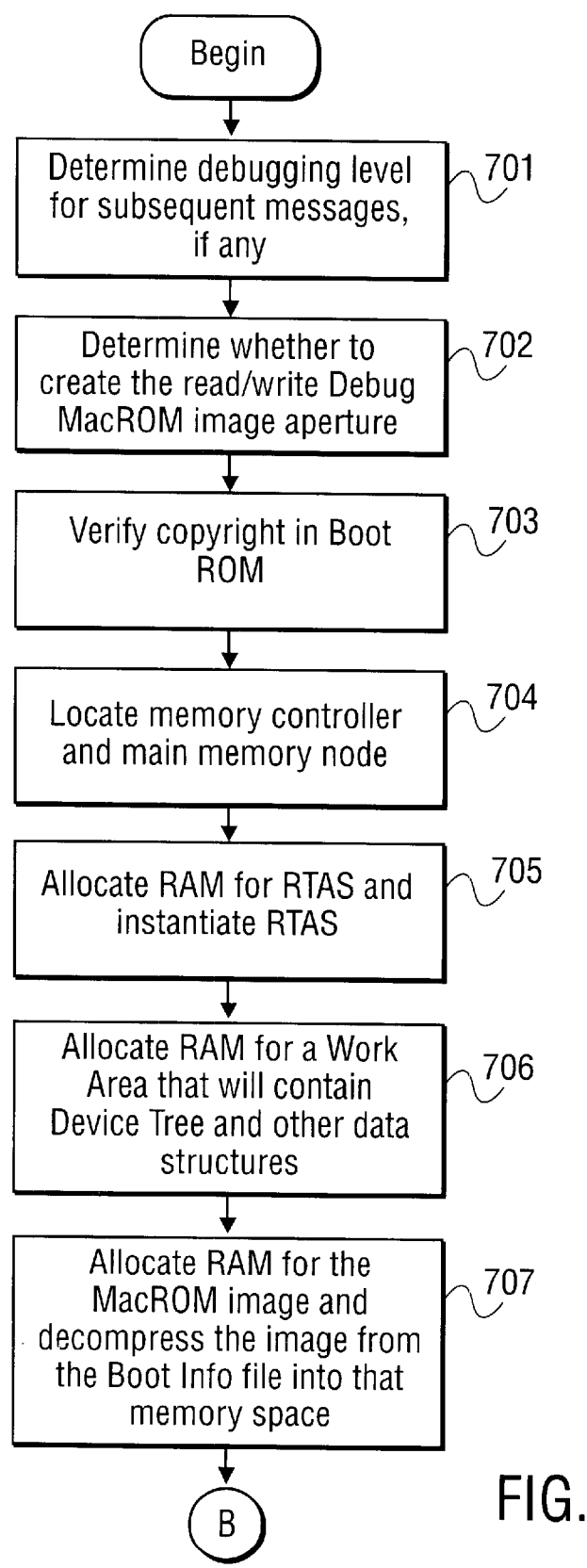
FIGS. 7A, 7B, 7C, and 7D collectively are a flow diagram illustrating operation of the Trampoline code.
Figure 7B:
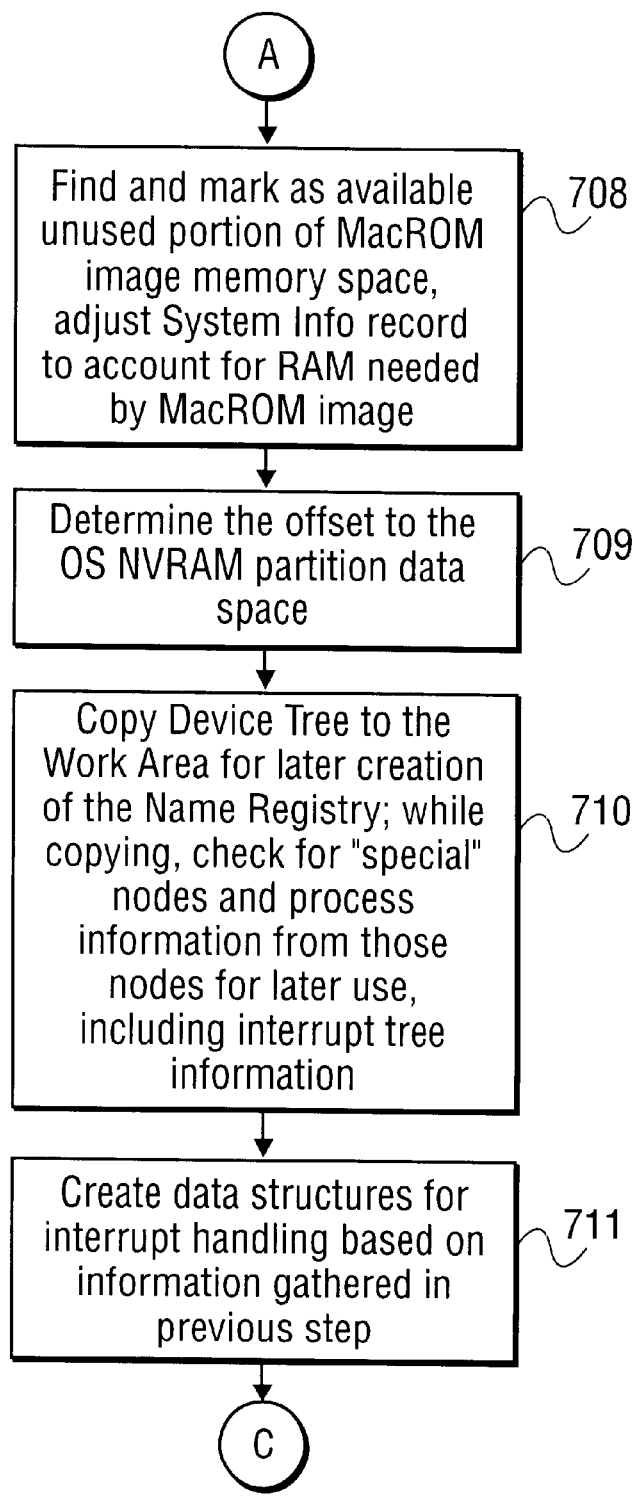
Figure 7C:
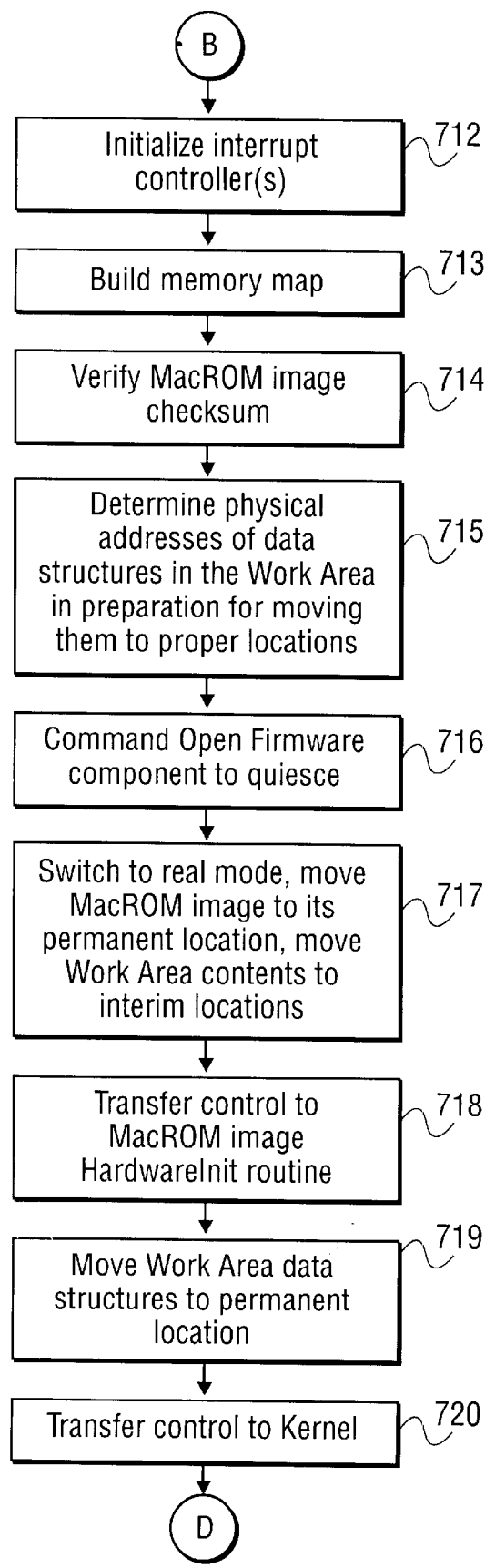
Figure 7D:
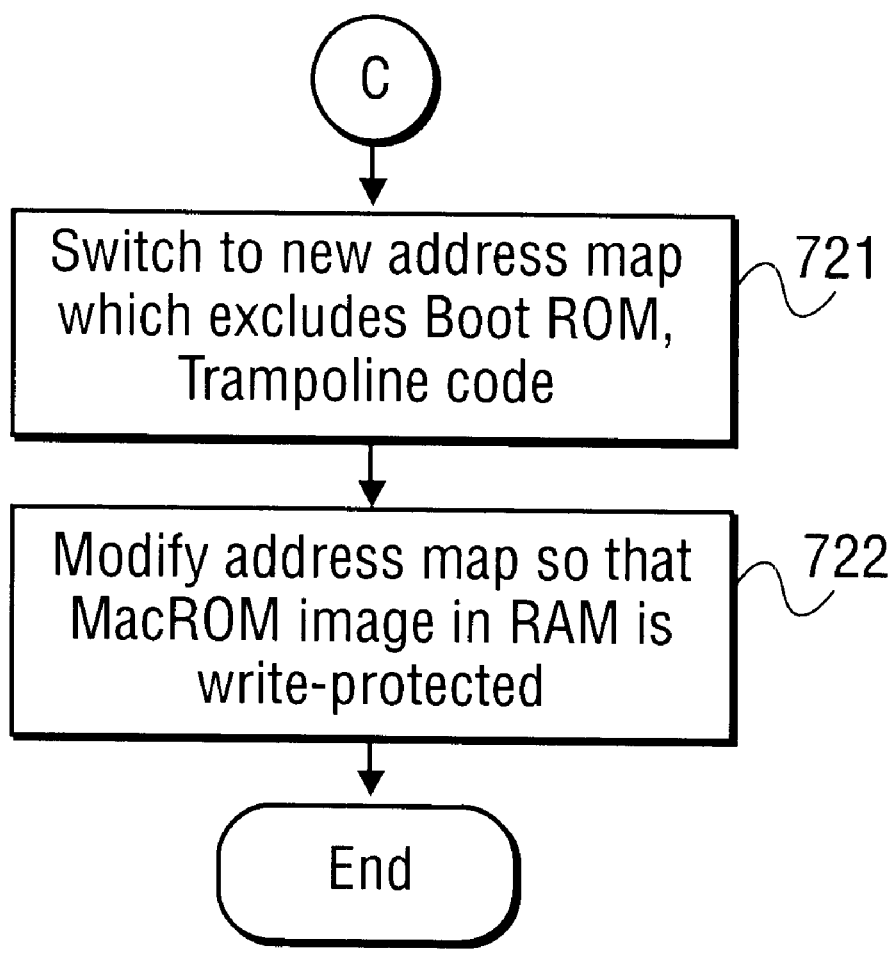

Referring now to FIGS. 5, 6A and 6B, the overall boot process of the improved OS 30 will now be described. In response to power on or reset at block 601 (FIG. 6A), the POST code executes (preliminary diagnostics, boot beep, initialization) at 602. At 603, the Open Firmware routine initializes and begins execution, including building the expanded Device Tree and the Interrupt Trees. At 604, the Open Firmware locates the Boot Info file 40, based on defaults and NVRAM settings, and loads the Boot Info file 40 into RAM 12. At 605, the Open Firmware executes the Forth script in the Boot Info file 40, which contains information about the rest of the file (offsets, etc.) and instructions to read both the Trampoline code 52 and the compressed ROM Image 53, and places them into a temporary place in RAM 12. At 606, the Open Firmware transfers control to the Trampoline code 52. At 607, the Trampoline code 52 decompresses the ROM Image 53 in RAM 12. In addition, the Trampoline code reallocates any unused memory space in the ROM Image 52; gathers information about the system from Open Firmware; creates data structures based on this information; terminates Open Firmware, and rearranges the contents of memory to an interim location in physical memory space. At 608, the Trampoline code 52 transfers control to the HardwareInit routine of the (now decompressed) ROM Image 53. At 609, the HardwareInit routine copies data structures to their correct places in memory and then calls the kernel of the OS. Next, at 610 the kernel fills in its data structures and then calls the 68K Emulator. At 611, the 68K Emulator initializes itself and then transfers control to the StartInit routine. At 612, the StartInit routine begins execution, initializing data structures and managers, and booting the MacOS (the high-level portion of the OS). Note that blocks 609 through 612, above, are specific to a Mac OS.

Trampoline Code

The operation of the Trampoline code 52 will now be described in greater detail. The Trampoline code 52 is the code that provides a smooth transition between Open Firmware and the MacOS. After execution of the Trampoline code before transfer of control to the ROM image, Open Firmware no longer "exists", i.e., its space in memory is overwritten, in contrast with earlier Macintosh OSs.

Before describing the Trampoline code further, it may be helpful to first understand parts of the boot process associated with an earlier Macintosh OS, such as the OS of FIG. 2. In the earlier OS, the HardwareInit routine first initializes the machine, generates a "boot beep", performs diagnostics, and fills in certain Mac OS kernel tables (SystemInfo, ProcessorInfo). Next, the HardwareInit executes a branch-and-link to (a limited-function) Open Firmware. The Open Firmware then creates a Device Tree, including some Mac OS-specific properties, and executes a return-to-caller, leaving itself in memory. The HardwareInit routine then transfers control to the kernel. The kernel then fills in tables based on knowledge about PowerPC processors. The kernel then initializes the memory map, based on a hard-coded, build-time table, and transfers control to the 68K Emulator. The 68K Emulator initializes and begins execution at StartInit. Next, certain software managers and hardware are initialized. The Name Registry is then initialized, including reading the Device Tree by making calls into the Open Firmware Client Interface. Initialization then continues. At this point, Open Firmware is no longer needed, so its space in memory can be overwritten.

In the improved OS of the present invention, the Boot ROM 11 is not OS-specific. Open Firmware does not have OS-specific properties, except for the ndrv's needed to boot the MacOS that are maintained as properties in the Device Tree. The improved OS provides the same functions as the earlier OS, but the order and location of those functions change.

At the time of its loading, the Trampoline code exists at an arbitrary location in RAM 12. Open Firmware is responsible for memory management until it is terminated, which is part of the design of the Trampoline code. The Trampoline code creates data structures and other information in RAM 12, but not in its final location, because Open Firmware controls memory management.

Operation of the Trampoline code is described now in further detail with reference to FIGS. 7A through 7D. At 701, the debugging level for subsequent messages, if any, is determined. More specifically, a node in the Device Tree is checked for a specific property, and if the property exists, then its value is used to determine the debugging level. At 702, it is determined whether to create the read/write Debug ROM Image aperture (a specific level of debugging will cause the Debug ROM Image aperture to be created), and at 703 the presence of the appropriate copyright notice in the Boot ROM 11 is verified. At 704, the memory controller and the main memory node are located. At 705, the Trampoline code allocates RAM for the RTAS and instantiates the RTAS. At 706, an appropriate amount of RAM (e.g., 768K in one embodiment) is allocated for a Work Area that will contain the Device Tree and various other data structures. At this point, in certain embodiments, information on the hardware configuration of the system (e.g., processor, memory devices, etc.) may be gathered from the Device Tree and saved in one or more records. At 707, space is allocated in RAM for the ROM Image 53, and the ROM Image 53 is then decompressed from the Boot Info file into the allocated space.

At 708, the unused portion of the ToolBox ROM Image is identified and marked as available, and the SystemInfo record is adjusted to account for the RAM needed by the ROM Image 53. At 709, the offset to the OS NVRAM partition data space is determined. At 710, the Device Tree is copied to the Work Area for later creation of the Name Registry. During the aforementioned copying, a check is made for "special" nodes and process information from those nodes for later use, including any information required by the OS, such as interrupt processing information and information about specific devices. Next, at 711, data structures for interrupt handling are created based on information gathered in block 710.

At 712, the interrupt controller(s) are initialized, and at 713 the memory map is built. At 714, the ROM Image checksum is verified, and at 715, the physical addresses of the data structures in the Work Area are determined in preparation for moving these data structured to their proper locations. At 716, the Trampoline code causes Open Firmware to quiesce, while allowing Open Firmware to shut down any active hardware that might be performing DMA or interrupts. At 717, the Trampoline code switches from virtual to real mode, moves the ROM Image to its permanent location in RAM, and moves the contents of the Work Area to interim locations. At 718, control is transferred to the HardwareInit routine of the ROM Image. At 719, the Work Area data structures are moved to the their permanent locations, and at 720, control is transferred from the HardwareInit code to the kernel.

At 721, the OS switches to a new address map which excludes the memory space corresponding to the Boot ROM and the Trampoline code. Finally, at 722, the address map is modified to write-protect the ROM image in RAM. At this point, execution of the improved OS continues essentially as it did with the earlier Macintosh OS. In particular embodiments, however, some initialization differences may include: the kernel's using pre-built data structures rather than building them itself; copying of information to allocated memory from the Work Area; the Name Registry initialization's using the linked-list data structures found in the Work Area and not using the Open Firmware Client Interface; and, run-time checks determining which hardware to initialize and which code to execute and install, instead of having only the correct code built in.

Thus, a computer operating system using a compressed ROM image loaded into RAM has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of operating a computer system, the computer system including a first storage device and an operating system, the method comprising, as part of initializing the computer system:

loading a compressed first portion of the operating system from a second storage device into the first storage device;

decompressing the compressed first portion of the operating system; and executing the decompressed first portion of the operating system from the first storage device.

2. A method as recited in claim 1, further comprising maintaining the compressed first portion of the operating system as a separate file in the second storage device prior to said loading.

3. A method as recited in claim 1, wherein the second storage device is located remotely from the computer system.

4. A method as recited in claim 1, wherein the computer system further includes a third storage device, wherein reading and storing are performed as a part of executing a second portion of the operating system stored in the third storage device.

5. A method as recited in claim 4, wherein the first storage devices comprises a random access memory, and the third storage device comprises a readonly memory.

6. A method as recited in claim 4, wherein the second portion of the operating system comprises a low-level portion of the operating system, and wherein the first portion of the operating system comprises an intermediate level of the operating system.

7. A method as recited in claim 4, further comprising mapping the first portion of the operating system stored in the third storage device out of a memory space of the computer system after said decompressing.

8. A method as recited in claim 4, wherein executing the first portion of the operating system comprises querying the second portion of the operating system to determine a hardware configuration of the computer system.

9. A method as recited in claim 4, further comprising write-protecting the memory space of the volatile memory device which corresponds to the first portion of the operating system after said decompressing.

10. A method as recited in claim 4, further comprising reallocating a memory space of the first storage device to make unused memory space of the first storage device allocated to the first portion of the operating system available for use by the computer system after said decompressing.

11. A method of operating a computer system, the computer system including a first storage device, a second storage device, and an operating system, the method comprising, as part of a boot process of the computer system:

executing a first portion of the operating system stored in the first storage device to cause a second portion of the operating system stored in a storage device other than the first storage device to be read into the second storage device, the second portion of the operating system including a third portion and a compressed fourth portion,; and executing the third portion to cause the fourth portion to be decompressed.

12. A method as recited in claim 11, wherein the first storage device is a read-only memory (ROM) and the second storage device is a random access memory (RAM).

13. A method as recited in claim 12, wherein the first portion of the operating system is a low-level portion of the operating system, and wherein the second portion is an intermediate portion of the operating system.

14. A method as recited in claim 12, further comprising mapping an address space of the computer system to exclude the first portion of the operating system stored in the ROM memory.

15. A method as recited in claim 12, further comprising write-protecting the memory space of the RAM which contains the decompressed fourth portion.

16. A method as recited in claim 12, further comprising reallocating a memory space of the RAM to make unused portions allocated to the decompressed fourth portion of the operating system available for use by the computer system.

17. A method as recited in claim 12, wherein said executing the first portion and said executing the second portion are performed as part of a boot process of the computer system.

18. A method of operating a computer system, the computer system including a read-only memory (ROM), a random access memory (RAM), and an operating system, the method comprising, as part of an initialization sequence of the computer system:

executing a first portion of the operating system stored in the ROM to locate a second portion of the operating system stored outside the ROM, at least part of the second portion being compressed;

storing the second portion of the operating system in the second RAM;

decompressing the compressed part of the second portion of the operating system;

executing at least part of the second portion of the operating system to:
retrieve first data indicative of a hardware configuration of the computer system from the ROM;
store second data corresponding to the first data in the RAM memory; and
use the second data to dynamically configure the second portion of the operating system.

19. A method as recited in claim 18, further comprising mapping an address space of the computer system to exclude the first portion of the operating system stored in the ROM.

20. A method as recited in claim 19, further comprising write-protecting at least part of the memory space of the RAM that contains the decompressed second portion.

21. A method as recited in claim 18, further comprising reallocating a memory space of the RAM to make available unused portions allocated to the decompressed fourth portion of the operating system. 22.

22. A method of operating a computer system, the computer system including a random access memory (RAM), a read-only memory ROM), a non-volatile storage device separate from the ROM, and an operating system,.the method comprising, as part of a boot sequence of the computer system:

executing a first, low-level portion of the operating system stored in the ROM to:
locate a second, compressed portion of the operating system stored in the non-volatile storage device, wherein the second, compressed portion of the operating system is an intermediate-level portion of the operating system; and
store the second portion of the operating system in the RAM;

decompressing the second portion of the operating system;

executing at least part of the second portion of the operating system from the RAM to
query the first portion of the operating system stored in the ROM to determine a hardware configuration of the computer system;
store data indicative of the hardware configuration of the computer system in the RAM; and
exclude the first portion of the operating system stored in the ROM from an address space of the computer system.

23. A device for use in a computer system, the computer system including a processor and a random access memory (RAM) and operating according to operating system code, the device comprising:
  means for reading a compressed image of a first portion of the operating system code, during system initialization, from a non-volatile storage device and storing the compressed image in the RAM;
  means for decompressing the compressed image of the first portion of the operating system in the RAM; and
  means for executing the first portion of the operating system code from the RAM.

24. A device as recited in claim 23, wherein the means for reading the compressed image of the first portion of the operating system code into the RAM comprises-means for reading the compressed image of the first portion of the operating system code into the RAM as part of an initialization of the computer system.

25. A device as recited in claim 23, further comprising a read-only memory (ROM), wherein the means for reading the compressed image of the first portion of the operating system code into the RAM comprises means for executing a second portion of the operating system stored in the ROM to read the compressed image from the non-volatile storage device into the RAM.

26. A device as recited in claim 25, further comprising means for querying the second portion of the operating system to determine a hardware configuration of the computer system.

27. A device as recited in claim 25, further comprising write-protecting at least part of the memory space of the RAM which contains the first portion after said decompressing.

28. A device as recited in claim 25, further comprising reallocating a memory space of the volatile storage device to make unused portions allocated to the first portion of the operating system available for use by the computer system after said decompressing.

29. A device as recited in claim 28, wherein the second portion of the operating system stored in the ROM comprises a low-level portion of the operating system, and wherein the first portion of the operating system comprises an intermediate-level portion of the operating system.

30. A device as recited in claim 29, further comprising means for maintaining the compressed image of the first portion of the operating system as a separate file in the non-volatile storage device prior to said reading.

31. A device as recited in claim 29, further comprising means for mapping the low-level portion stored in the ROM out of a memory space of the computer system after said decompressing.

32. A computer system comprising:
  a processor for controlling the computer system based on an operating system;
  a first memory coupled to the processor;
  a second memory coupled to the processor, the second memory having stored therein a first portion of the operating system, including instructions which configure the processor to, as part of a boot sequence of the computer system:
    locate and retrieve a second portion of the operating system from a storage device; and
    store the second portion of the operating system in the first memory;
  wherein the second portion of the operating system includes a third portion and a compressed fourth portion, and wherein the third portion includes instructions which configure the processor to decompress the fourth portion.

33. A computer system as recited in claim 32, wherein the first memory is a random access memory (RAM), and the second memory is a read-only memory (ROM).

34. A computer system as recited in claim 32, wherein the second portion of the operating system further comprises instructions which configure the processor to:
  retrieve first data indicative of a hardware configuration of the computer system from the second memory; and
  store second data corresponding to the first data in the first memory.

35. A computer system as recited in claim 32, wherein the operating system further comprises instructions which configure the processor to map an address space of the computer system to exclude the first portion of the operating system stored in the second memory.

36. A computer system as recited in claim 35, wherein the operating system further comprises instructions which configure the processor to write-protect at least part of the memory space of the volatile memory that contains the decompressed second portion.

37. A computer system as recited in claim 32, wherein the operating system further comprises instructions which configure the processor to reallocate a memory space of the second memory to make available unused portions allocated to the decompressed fourth portion of the operating system.

38. A computer system comprising:
  a processor for controlling the computer system based on an operating system;
  a random access memory (RAM) coupled to the processor;
  a read-only memory (ROM) coupled to the processor, the ROM having stored therein a first portion of the operating system, including instructions which configure the processor to, as part of a boot sequence of the computer system:
    locate a second portion of the operating system, at least part of which is compressed; and,
    store the second portion of the operating system in the RAM; wherein the second portion of operating system includes instructions which configure the processor to:
      decompress the compressed part of the second portion of the operating system in the RAM;
      retrieve first data indicative of a hardware configuration of the computer system from the ROM; and
      store second data corresponding to the first data in the RAM.

39. A computer system as recited in claim 38, wherein the second portion of the operating system further comprises instructions which configure the processor to write-protect at least part of the memory space of the RAM that contains the second portion of the operating system.

40. A computer system as recited in claim 39, wherein the second portion of the operating system further comprises instructions which configure the processor to map an address space of the computer system to exclude the first portion of the operating system stored in the ROM.

41. A computer system as recited in claim 38, wherein the second portion of the operating system further comprises instructions which configure the processor to reallocate a memory space of the RAM to make available unused portions allocated to the second portion of the operating system.

\* \* \* \* \*